United States Patent Office 3,833,604
Patented Sept. 3, 1974

3,833,604
HISTIDINE DERIVATIVES
Derek John Schafer, Beverley, England, assignor to Reckett & Colman Products Limited, Hull, Yorkshire, England
No Drawing. Filed Jan. 9, 1973, Ser. No. 322,124
Claims priority, application Great Britain, Jan. 20, 1972, 2,695/72
Int. Cl. C07d 49/36
U.S. Cl. 260—309                                3 Claims

ABSTRACT OF THE DISCLOSURE

The invention relates to a novel derivative of histidine of formula:

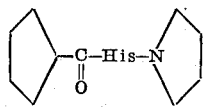

in which His is L-histidyl, and its pharmaceutically acceptable salts.

The novel compound and its salts with pharmaceutically acceptable acids are useful because of their inhibiting action on the hypothalamic thyrotropin releasing hormone (TRH).

---

This invention relates to a derivative of histidine and to processes for its preparation. The invention also relates to therapeutic compositions comprising as the active ingredient this histidine derivative.

According to this invention there is provided a compound of the formula

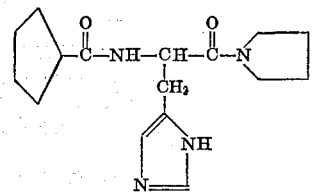

which is conventionally represented as

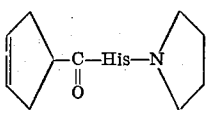

in which His is L-histidyl, and salts with pharmaceutically acceptable acids.

The invention also provides therapeutic compositions comprising as active ingredient the compound of formula I or a salt with a pharmaceutically acceptable acid in association with a pharmaceutically acceptable diluent or carrier.

The compound of the present invention inhibits the action of the hypothalamic thyrotropin releasing hormone (TRH). This action is demonstrated in mice by bioassay or in man by radioimmunoassay measurement of the released thyrotropin (TSH).

The compound may be of use in the diagnosis and treatment of conditions affecting the hypothalamo-pituitary thyroid axis in those cases where it is desired to decrease the amount of circulating TSH. It may also be useful in inhibiting actions of TRH other than the release of TSH.

Examples of such diagnostic and therapeutic use include the suppression of TSH in the diagnosis of hyperthydroidism, the treatment of non-toxic goitres, the prevention of goitre formation during treatment of hyperthydroidism and in the treatment of TSH-dependent carcinomas.

The compound of formula I may be prepared by coupling by standard techniques of peptide chemistry a compound of formula II

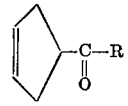

in which R is any group commonly used for the formation of peptide bonds such as azide, chloride, or substituted phenoxy (e.g. p-nitrophenoxy or pentachlorophenoxy) or hydroxy with a compound of formula III

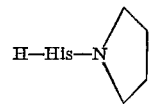

When R is hydroxy the coupling is carried out in the presence of a coupling agent such as dicyclohexylcarbodiimide.

I-Histidyl pyrrolidine of formula III may be prepared by reacting pyrrolidine either with Z—His—OH (where Z is an N-protecting group commonly used in peptide chemistry such as t-butoxy carbonyl or benzyloxycarboxy) in the presence of dicyclohexylcarbodiimide, or with Z—His—X (where X is a reactive group such as azide or substituted phenoxy), followed by the removal of the N-protecting group. The benzyloxycarbonyl group may be removed by catalytic hydrogenation or using hydrogen bromide in acetic acid and the t-butoxycarbonyl group may be removed using hydrogen chloride in an organic solvent or using anhydrous trifluoroacetic acid.

Alternatively the compound of formula I may be prepared by coupling by standard techniques of peptide chemistry a compound of formula II in which R is as hereinbefore defined with a compound of formula IV H—His—R'             IV in which R' is hydroxy or alkanoxy such as lower alkoxy, phenoxy or benzyloxy, provided that R' may not be hydroxy when R is hydroxy, to form a compound of formula V

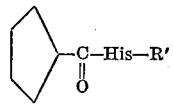

which may be coupled with pyrrolidine. In the compound of formula V the group R' may be replaced by azide or chloride and the product coupled with pyrrolidine. When R or R' are hydroxy it is necessary to have present a coupling agent such as dicyclohexylcarbodiimide.

In either of the above techniques the L-histidyl side-chain may be protected for example as the benzyl derivative, the benzyl group being removed at a convenient stage in the synthesis.

The invention is illustrated by the following non-limiting example

EXAMPLE

N-(Cyclopentylcarbonyl-L-histidy)-pyrrolidine
(cpc-His-pyr)

(i) N - (Benzyloxycarbonyl-L-histidyl)pyrrolidine.—A solution of benzyloxycarbonyl-L-histidine azide in ethyl acetate (80 ml.), prepared from the hydrazide (3.03 g.), was added at 0° C. to pyrrolidine (1.24 ml.). The mixture was kept at 0° C. for 3½ hours, evaporated, the residue dissolved in 1N hydrochloric acid (100 ml.) and the solution washed with ether. Excess solid sodium hydrogen carbonate was added, the product extracted into ethyl acetate, the combined extracts dried ($Na_2SO_4$) and evaporated giving crude crystalline product (2.3 g.). Recrystallisation from ethyl acetate/ethanol gave the desired product (1.67 g.), m.p. 144–146° C., $[\alpha]_D^{25}$ +24.8° (c 1, dimethylformamide).

*Analysis.*—Found (percent): C, 63.0; H, 6.5; N, 16.1. $C_{18}H_{22}N_4O_3$ requires (percent): C, 63.1; H, 6.5; N, 16.4.

(ii) N-(t-Butoxycarbonyl-L-histidyl)pyrrolidine.—A solution of t-butoxycarbonyl-L-histidine methyl ester (1.35 g.) and pyrrolidine (0.83 ml.) in methanol (4 ml.) was kept at room temperature for 12 days. Ether (5 ml.) was added, the mixture was filtered, the filtrate evaporated and the residue dissolved in 1N hydrochloric acid (40 ml.). This solution was washed with ether, excess solid sodium hydrogen carbonate added, and the product extracted into ethyl acetate. The combined extracts were dried ($Na_2SO_4$) and evaporated giving crude product (1.24 g.) as a gum. The desired product crystallised from ethanol/ether as colourless crystals (0.50 g.) m.p. 116–120 C., $[\alpha]_D^{25}$ +22.0° (c 1, dimethylformamide).

*Analysis.*—Found (percent): C, 58.0; H, 7.7; N, 17.9. $C_{15}H_{24}N_4O_3$ requires (percent): C, 58.4; H, 7.8; N, 18.2.

(iii) N - (L - Histidyl)pyrroline dihydrochloride.—(a) Hydrogen chloride in dioxan (4N, 25 ml.) was added to a solution of N-(t-butoxycarbonyl-L-histidyl)pyrrolidine (0.308 g.) in dioxan (10 ml.) and methanol (3 ml.). After 45 minutes at room temperature, the mixture was evaporated, the residue precipitated from methanol with ether and washed, by decanting, with ether giving the product as a white amorphous powder (0.277 g.), $[\alpha]_D^{25}$ +8.5° (c 1, dimethylformamide).

(b) A solution of N-(benzyloxycarbonyl-L-histidyl)pyrrolidine (0.342 g.) in methanol (15 ml.) and 6N hydrochloric acid (0.5 ml.) was hydrogenated at room temperature and atmospheric pressure for 17 hours over 10% palladium/charcoal (0.050 g.). The mixture was filtered (Celite), evaporated and the residue recrystallised from methanol/ether giving product (0.282 g.), m.p. 165° C. (decomp.), $[\alpha]_D^{25}$ +8.0° (c 1, dimethylformamide).

(iv) Cycloypentanecarboxylic acid p-nitrophenyl ester.—N,N'-dicyclohexylcarbodiimide (8.24 g.) was added to a stirred solution of cyclopentane carboxylic acid (4.60 g.) and p-nitrophenol (5.56 g.) in ethyl acetate (50 ml.) at 0° C. and the reaction mixture was stirred overnight. The mixture was filtered, the urea washed with ethyl acetate, the filtrate and washings evaporated, dissolved in ether, filtered, evaporated and the crystalline residue recrystallised from 90% aqueous ethanol to give product (5.3 g.), m.p. 43–44° C.

*Analysis.*—Found (percent): C, 61.3; H, 5.5; N, 5.75. $C_{12}H_{13}NO_4$ requires (percent): C, 61.3; H, 5.6; N, 6.0.

(v) N-(Cyclopentylcarbonyl-L-histidyl)pyrrolidine (cpc-His-pyr).—Triethylamine (0.28 ml.) and cyclopentanecarboxylic acid p-nitrophenyl ester (0.26 g.) were added to a stirred solution of N-(L-histidyl)-pyrrolidine dihydrochloride (0.270 g.) in dimethylformamide (2 ml.) at room temperature. The mixture was kept at 0° overnight, filtered, the triethylamine hydrochloride washed with dimethylformamide and the combined filtrate and washings (ca. 4.5 ml.) diluted with 5% (by volume) of water. This solution was put on a column of sulphoethyl "Sephadex" C-25 resin (25 g. weighed as moist resin; 5 cm. column) equilibrated with dimethylformamide.

The column was washed with 5% water in dimethylformamide to remove neutral and acidic co-products and was then eluted with 2.5% triethylamine, 9% water in dimethylformamide. Fractions containing product (as detected by TLC) were combined, evaporated and the residue triturated with ether giving crude product as a gum (0.200 g.). This was dissolved in dioxan, 4N hydrogen chloride in dioxan added and the precipitate washed with ether by decanting, dissolved in water, filtered and lyophilized giving the product as the hydrochloride (0.181 g.), $[\alpha]_D^{25}$ −2.0° (c 1,4, dimethylformamide).

*Analysis.*—Found (percent): C, 53.5; H, 7.5; N, 15.4 $C_{16}H_{24}N_4O_2$, HCl, $H_2O$ requires (percent): C, 53.5; H, 7.6; N, 15.6.

Investigations to determine the level of inhibition of the activity of TRH were carried out by a method, based on an assay of the activity of TRH of C. Y. Bowers ("Hypophysiotropic Hormones of the Hypothalaus," The Williams and Wilkins Co., 1970, p. 80). Groups of mice were fed on a low-iodine diet for two weeks, being kept at an environmental temperature of 14° C. during the last four days, then $^{131}I$ was given with triiodothyronine (usually 0.1µg.) and 24 hours later the first blood sample (initial) was taken; samples of TRH, or saline (as control) or of TRH followed immediately by cpc-His-pyr (as hydrochloride) were then administered intravenously and two hours later a second blood sample (final) was taken; blood radioactivities were measured in counts per minute (c.p.m.) and the response was expressed as $$\log_{10}\left(\frac{\text{Final c.p.m.}}{\text{Initial c.p.m.}} 100\right)$$

The results shown in Table I indicate a statistically significant (P<0.01) decrease in the response to TRH when this is followed cpc-His-pyr (C).

TABLE I

| Substance injected: | Bioassay reponse (±S.E.) |
|---|---|
| Bioassay I: | |
| Saline | 1.99±0.01 |
| TRH (6 ng) | 2.53±0.16 |
| TRH (6 ng)+C(6 ng) | 1.93±0.05 |
| Bioassay II: | |
| Saline | 1.99±0.02 |
| TRH (6 ng) | 2.14±0.01 |
| TRH (6 ng)+C(6 ng) | 2.01±0.01 |
| TRH (6 ng)+C(60 ng) | 1.98±0.01 |

When cpc-His-pyr (400 µg.) was administered to two human subjects immediately before TRH (400 µg.) the amounts of radioimmunoassayable TSH given in Table II were found in blood samples taken at the times indicated. The results of giving TRH (400 µg.) alone one week previously in the same subjects are also given in Table II.

TABLE II
TSH values µU/ml.) at the following times (minutes) after TRH injection

| | −10 | 0 | 10 | 20 | 30 | 45 | 60 | 90 |
|---|---|---|---|---|---|---|---|---|
| Subject: A: | | | | | | | | |
| TRH alone | 4 | 4 | 12 | 15 | 15 | 13 | 10 | 9 |
| TRH + C | 3 | 3 | 5 | 7 | 8 | 6 | 6 | 5 |
| B: | | | | | | | | |
| TRH alone | 2 | 2 | 7 | 8 | 8 | 7 | 4 | 4 |
| TRH + C | 2 | 2 | 4 | 5 | 7 | 4 | 4 | 4 |

These figures suggest that with these two subjects, administration of cpc-His-pyr immediately before the administration of TRH reduces the TSH response to TRH.

What is claimed is:

1. A compound selected from the group consisting of a compound of the formula

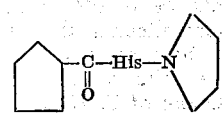

in which His is L-histidyl or a pharmaceutically acceptable salt thereof.

2. The compound of the formula
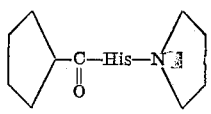
in which His is L-histidyl.
3. The hydrochloride of the compound of the formula
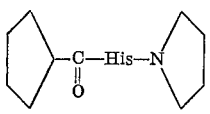
in which His is L-histidyl.
References Cited
UNITED STATES PATENTS
3,330,857   7/1967   Hess _____ 260—309
OTHER REFERENCES
Guttmann: Chem. Abs., vol. 55, columns 23360–66 (1961).
NATALIE TROUSOF, Primary Examiner
U.S. Cl. X.R.
260—468 R; 424—273